United States Patent [19]
Collot et al.

[11] Patent Number: 6,089,846
[45] Date of Patent: Jul. 18, 2000

[54] FEED DEVICE FOR A PRESSURE DIE-CASTING OR INJECTION MACHINE

[75] Inventors: Jean Collot, Antibes; Philippe Roehr, Lautenbach-Zell, both of France

[73] Assignee: Celes, Lautenbach, France

[21] Appl. No.: 08/851,699

[22] Filed: May 6, 1997

[30] Foreign Application Priority Data

May 22, 1996 [FR] France ................... 96 06364

[51] Int. Cl.[7] ............... B29C 45/18; B30B 15/30
[52] U.S. Cl. ............... 425/98; 164/312; 414/198; 425/447
[58] Field of Search ............... 425/586, 174.4, 425/256, 258, 447, DIG. 39, 397, 98, 102, 103, 145; 164/900, 312; 264/478, 486, 328.17, 328.19; 414/172, 176, 198, 749; 219/647, 650, 652, 655, 656, 657

[56] References Cited

U.S. PATENT DOCUMENTS

| | | | |
|---|---|---|---|
| 2,852,809 | 9/1958 | Miles et al. .................. | 425/258 |
| 3,133,179 | 5/1964 | Armstrong et al. ........... | 219/655 |
| 3,877,862 | 4/1975 | Murray ....................... | 425/258 |
| 4,017,703 | 4/1977 | Lavins, Jr. et al. .......... | 219/655 |
| 4,971,544 | 11/1990 | Schneeberger ............... | 425/397 |
| 4,984,952 | 1/1991 | Reuter ....................... | 414/198 |
| 5,533,562 | 7/1996 | Moschini et al. ............ | 164/900 |
| 5,872,352 | 2/1999 | Suganuma et al. ........... | 219/652 |

FOREIGN PATENT DOCUMENTS

WO9213662 of 1992 WIPO.

OTHER PUBLICATIONS

Manufacturing Technologn Note Quigley, "Economical Carting" . . . 1979.

*Primary Examiner*—Harold Pyon
*Assistant Examiner*—Emmanuel Luk
*Attorney, Agent, or Firm*—Roland Plottel

[57] ABSTRACT

A feed device for an injection chamber of a pressure die-casting or injection machine or for a press tool or a forging press die transfers a billet into an injection chamber or die press. The billet may be of metal or plastic, filled or unfilled, and in a liquid, solid, semi-liquid or semi-solid state. A support with a horizontal axis receives and houses the billet. A ram moves the support and thus transfers the billet into at least one heating system. The ram that transfers the billet also moves the support in a horizontal translational motion transporting the billet from the heating position to a position lying vertically above the injection chamber of the tool or the press die, and then moves the support with a rotational motion about its axis so as to cause the billet to drop, horizontally, due to gravity, from the support into the injection chamber or into the press die.

22 Claims, 7 Drawing Sheets

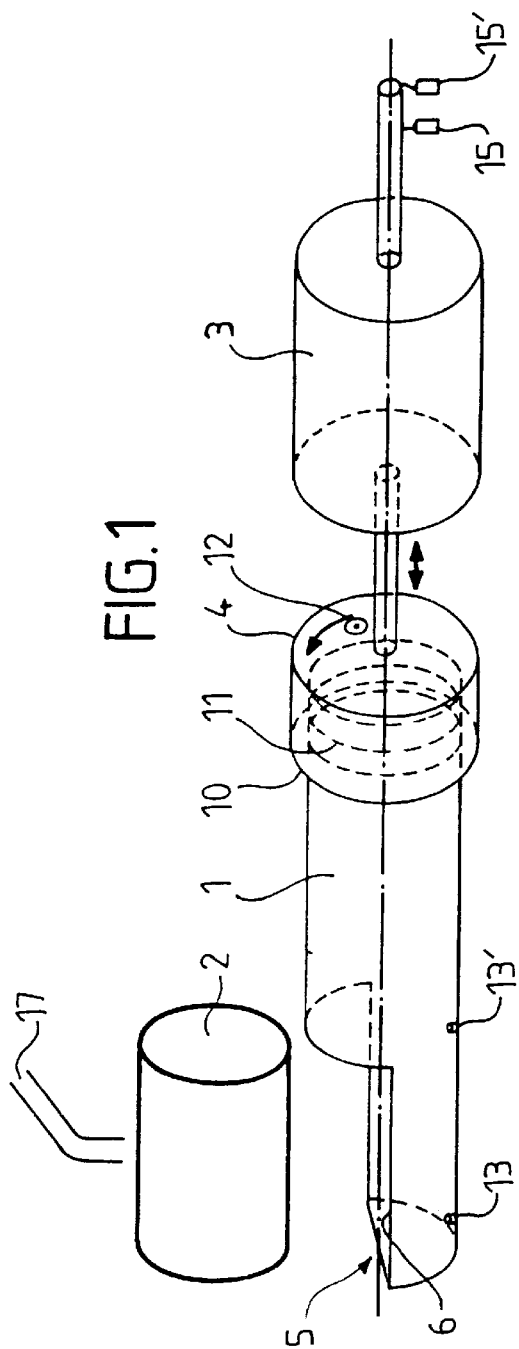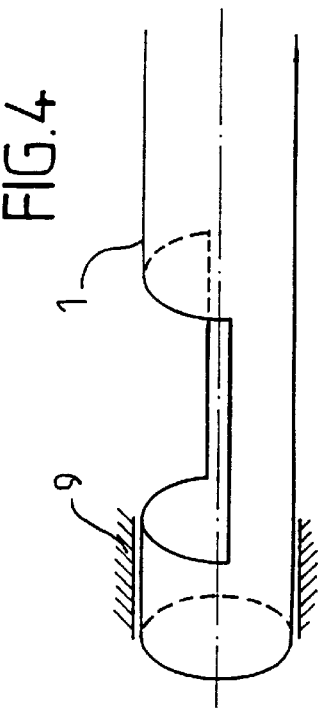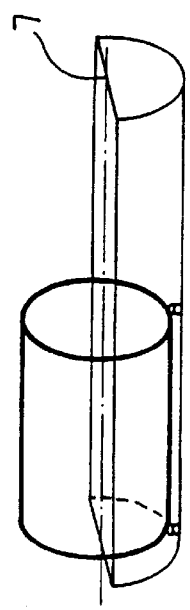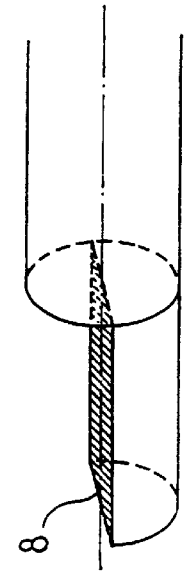

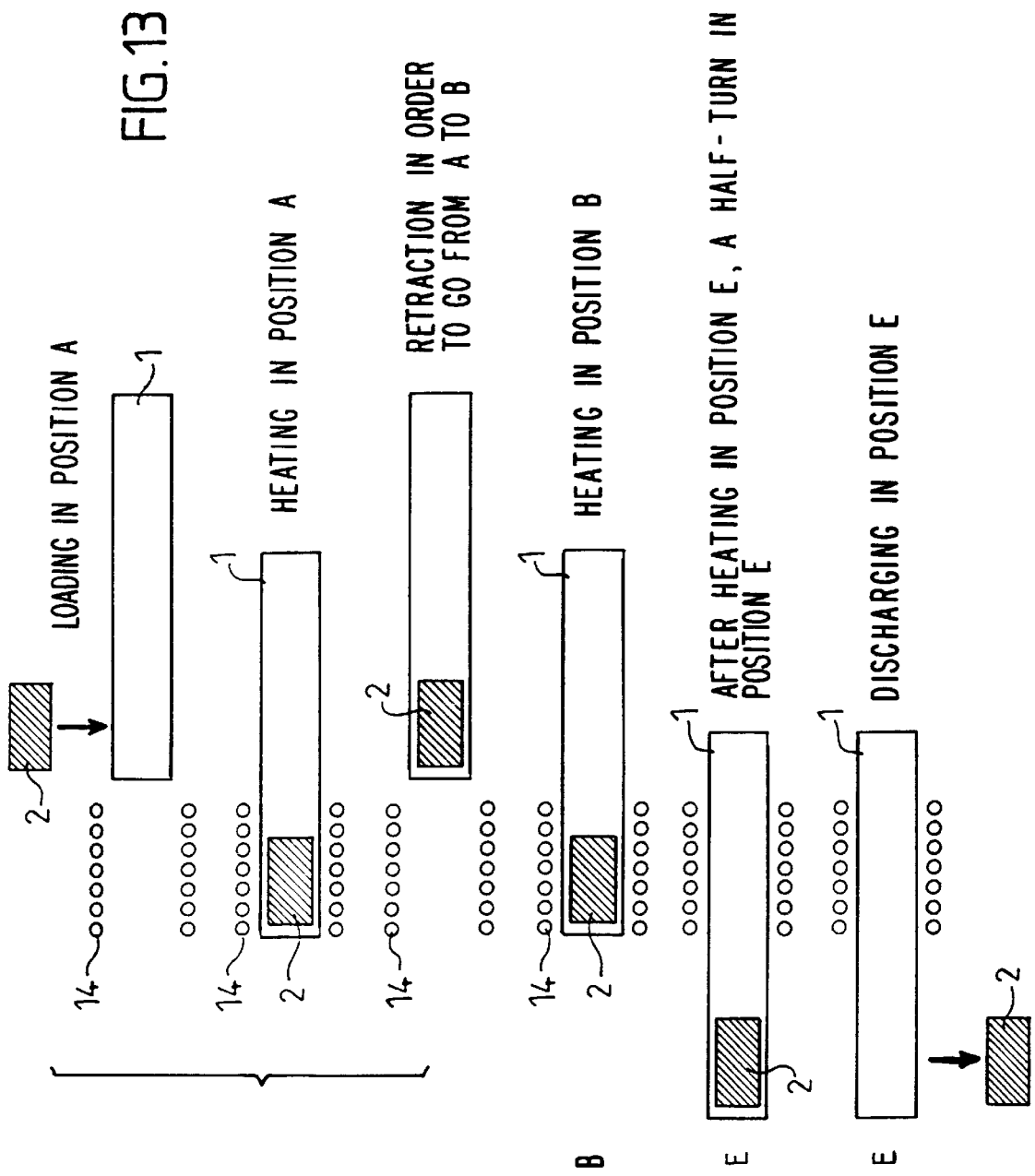

FEED DEVICE FOR A PRESSURE DIE-CASTING OR INJECTION MACHINE

BACKGROUND OF THE INVENTION

The present invention relates to a feed device for a pressure die-casting or injection machine, or for the press tool of a forging machine and in particular of a forging press die, for materials in the semi-solid, solid, semi-liquid or liquid state.

It relates more particularly to the feed device for the injection chamber of such a machine, or of the press die, this device heating and transferring billets If made of metal or plastic, whether filled or unfilled, and enabling them to be fed, rapidly, into the injection chamber or the press die.

DESCRIPTION OF RELATED ART

Hitherto, manipulators are used to transfer reheated billets into the injection chamber of pressure die-casting machines. These manipulators are designed so as to grip the reheated billet in a vertical position, at the exit of the reheat furnace, and to transfer it into the injection chamber. There are many drawbacks with this prior approach, for example:

the reheated billet in a vertical position tends to loose shape, given its upward slenderness;

there is a risk of the billet deforming while it is being gripped by the manipulator;

the transfer time between the reheat furnace and the injection chamber is too long;

there is a loss of material during transfer;

it takes several minutes to reheat a billet, this being unacceptable for billets consisting of metals such as magnesium which burn or oxidize at the end of reheating; and it is complicated to put the system under a protective atmosphere.

Francis Quigley's article "Economical Casting of Ferrous Alloys", published in "MANUFACTURING TECHNOLOGY NOTE", July 1979, NTN 79/0682 describes a technique for feeding an injection machine in which the semi-solid billet is heated in a vertical position and then delivered via a toboggan into a feed system of the piston type of the injection chamber of a die-casting machine. This prior technique has a number of drawbacks relating in particular to heating in a vertical position as well as to transferring along a toboggan which causes rubbing, leading to deformation of the billet. This technique is therefore not satisfactory.

Other devices exist which are designed so as to push the billet using a piston in order to bring it into the injection chamber, these devices running the risk of the billet deforming when the latter is in the pasty state, resulting in a loss of material.

Finally, other devices are known which are produced so as to deliver the billet by rotating it along an inclined plane. These known devices also run the risk of the billet deforming during its rolling phase. Moreover, over, these devices require an excessively long transfer time.

BRIEF SUMMARY OF INVENTION

The present invention sets out to provide a device which alleviates the drawbacks of the prior approaches mentioned briefly hereinabove.

The subject of this invention is therefore a feed device for an injection chamber of a pressure die-casting or injection machine or for a press tool or a forging press die, this device transferring a billet of metal or plastic, whether filled or unfilled, in the liquid, solid, semi-liquid or semi-solid state, which has a support with a horizontal axis receiving and housing the billet and means for moving the support for the purpose of transferring the billet into the injection chamber or into the press die, characterized in that the support is positioned in at least one heating system and in that the means for transferring the billet consist, on the one hand, of means moving the support in a horizontal translational motion transporting the billet from the heating position to a position lying vertically above the injection chamber or the press die and, on the other hand, of means for moving the support in a rotational motion about its axis so as to cause the billet to drop, still in the horizontal position, under gravity, from the support into the injection chamber or into the press die.

According to the invention, the support consists of a tube, possibly having a circular, or prismatic cross-section, made of a refractory, the diameter of which tube is slightly greater than that of the billet to be transferred. This tube has a cut-out which defines an approximately semi-cylindrical housing for receiving the billet. This cut-out may be produced so as to define a spoon-shaped or trough-shaped housing and may optionally be made over the entire length of the tube.

According to the invention, the tube receiving the billet is fitted into a cylindrical metal piece, with interposition of seals for example 0-ring seals, so as to hold the said tube tight in this metal piece. The latter may be pierced with a nozzle connected to a pipe for supplying a protective gas.

According to one characteristic of the invention, the metal piece holding the tube tight is mounted on a pneumatic ram which imparts to the tube a rotational motion with respect to its axis, this rotary pneumatic ram being itself mounted on the end of ram imparting to the tube a to-and-fro (front-rear) translational motion along its axis.

According to the invention, the tube receiving the billet is positioned in at least one induction heating or Joule-effect heating system, the axes of the heating systems lying, just before initiating the rotational motion of the tube, substantially in the vertical plane passing through the axis of the injection chamber or of the press die.

According to another aspect of this invention, the subject thereof is a pressure die-casting or injection machine, or a forging press for a material in the liquid, semi-solid or semi-liquid state, characterized in that it has a plurality of feed devices as defined hereinabove.

Other characteristics of the invention are defined in the claims appended to the present description Embodiments of the present invention will now be described with reference to the appended drawings. It remains the case, of course, that these embodiments have in no way a limiting character.

BRIEF DESCRIPTION OF THE DRAWINGS

FIG. 1 is a perspective diagrammatic view of a first embodiment of the feed device according to the present invention;

FIGS. 2 to 4 are perspective partial diagrammatic views of various alternative forms of the billet support used in the feed device according to the invention;

FIG. 13 illustrates the sequences in the operation of the alternative form of the invention illustrated by FIG. 12.

DETAILED DESCRIPTION OF THE PREFERRED EMBODIMENTS

Figure 5:
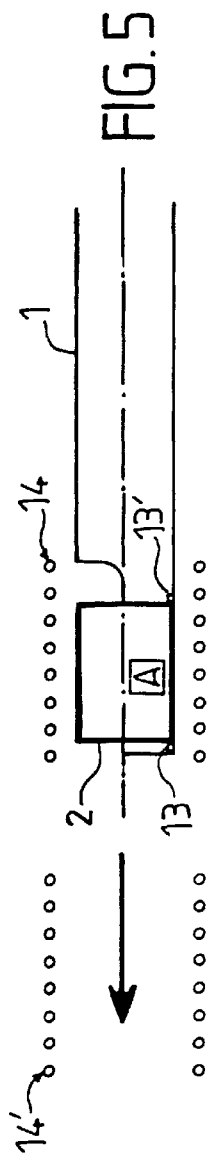
FIGS. 5 to 8 are side-elevation diagrammatic views illustrating the various phases in the operation of the feed device according to the present invention.

Reference is firstly made to FIG. 1 which represents the feed device according to the present invention, according to its preferred embodiment.

In this embodiment, the feed device comprises a support for the billet 2, which is produced in the form of a tube 1, made of a refractory, for example made of ceramic, quartz or alumina, or made of reinforced plastic or composite. This tube 1 has a diameter slightly greater than that of the billet 2 which has to be transferred into the injection chamber (the latter is not shown in FIG. 1 but may be seen at 16 in FIGS. 9 to 12) of the pressure die-casting and injection machine or into the die of a forging press. The tube 1 is fitted into a cylindrical metal piece 10 with interposition of seals, for examine O-ring seals 11, so as to hold the tube 1 tight. The cylindrical piece 10 includes in its end all a nozzle 12 into which a pipe for supplying a protective gas runs. This is because, according to the invention, such a protective gas is used in the case in which the device must handle billets consisting of metals, such as magnesium, which are liable to burn or oxidize. This protective gas may, for example, be a mixture of $CO_2$, $SF_6$ and air or a mixture of $CO_2$ and $SF_6$ without air.

The tube 1, which has a circular or prismatic cross-section, is provided with a cut-out 5 which defines a semi-cylindrical housing intended to receive the billet 2. In FIG. 1, this housing has the shape of a spoon 6. In the alternative form illustrated in FIG. 2, the cut-out is made over the entire length of the tube and the housing 7 for the billet then has a completely semi-cylindrical shape. In the alternative form of the invention illustrated in FIG. 3, the housing for the billet has the shape of a trough 8. In the case of the alternative form illustrated in FIG. 4, the tube 1 has an extension, this being manifested by an appreciable cantilever, and, according to the invention, means 9 intended to support one of the ends of the said tube are provided in this case.

That part of the tube 1 provided with the cut-out 5 and serving as a housing for the billet 2 to be transferred has pegs such as 13, 13' in the bottom of it, these pegs being made of the same material as the tube and intended to serve as chocks for the billet 2 so as to prevent the latter from moving in its housing. This is because, under the effect of the magnetic field developed by the induction heating system, described below (FIGS. 5 to 8, references 14, 14'), the billet 2 may have a tendency to move if it is not perfectly centred in the induction heating system. This phenomenon occurs more particularly in the case of billets made of very light materials, for example magnesium-based alloys. The presence of the pegs such as 13 and 13' is even more important when the device handles billets made of magnesium alloy having a high (30 to 40%) lithium content, these billets having a relative density of less than 1.

According to the invention, provided above the end of the tube 1 equipped with the housing for the billet 2 is a pipe 17 for supplying a release product so as to prevent any bonding of the billet in its housing.

As explained in the preamble of the present description, the tube 1, designed so as to receive and house the billet 2, includes, on the one hand, means enabling it to be moved in a horizontal translational motion in order to transport the billet from a heating cell to a position lying vertically above the injection chamber or the press die when the device according to the invention is applied to a forging machine, and, on the other hand, means for moving this tube in a rotational motion so as to cause the billet to drop, under gravity, from the tube 1 Into the injection chamber, or into the press die. In the embodiment illustrated in FIG. 1, these means are produced in the form of two rams:

on the one hand, a pneumatic ram 4 imparting to the tube 1 a rotational motion with respect to its axis, shown diagrammatically by the dot-dash line in FIG. 1. Preferably, this rotational motion enables the tube 1 to undergo a half-turn in approximately 0.1 s;

on the other hand, a pneumatic ram 3 fixed to the pneumatic rotary ram 4, this ram 3 imparting to the tube 1 a to-and-fro (front or rear) translational motion along the axis of this tube.

According to the invention, end-of-travel contacts 15, 15' are provided on the rod of the translational pneumatic ram 4 so as to turn on or off the reheating system which is placed around the feed device illustrated in FIG. 1, as will now be described.

Thus, as shown especially in FIGS. 5 to 8, the reheating system may be produced in the form of an induction heating system 14, 14', the coils of which are coaxial with the tube 1 and surround the latter. Of course, it is possible to use another type of heating, for example Joule-effect heating.

In FIGS. 5 to 8, two inductors 14, 14' are provided, however the number of inductors may be reduced to just one, or be greater than 2. This is because the device according to the present invention is able to use a single inductor supplied with powers and successive frequencies which are different so as to heat the billet 2 in a time of less than or approximately one minute. At the end of the cycle, the billet 2 is thus raised to a uniform temperature which lies between the liquidus and solidus temperatures of the metal or alloy of which the billet 2 is composed. When two inductors are used, as in the case in the embodiment illustrated in FIGS. 5 to 8, one of the inductors, 14, serves to preheat the billet 2 right through while the second inductor, 14', is used to maintain the temperature of the billet so as to obtain a uniform temperature throughout the mass of the latter.

According to the present invention, a system for reheating the billets is provided. Instead of being positioned in the transfer tube 1 at ambient temperature, these billets may be placed therein at a higher temperature by virtue of preheating carried out, for example, in a tunnel or Joule-effect furnace. The billets, having thus absorbed a certain quantity of heat beforehand, then require less time to be raised to the appropriate temperature by the induction heating system 14, 14'. Thus, preheating to about 100° C. or a few hundreds of degrees Celsius is sufficient to decrease the induction heating time by several seconds or even several minutes if the billet is large.

FIGS. 5 to 8 illustrate the various successive phases in the operation of the feed device according to the present invention, as illustrated in FIG. 1.

FIG. 5 shows the billet 2 in its preheating position A in the centre of the preheat inductor 14, the billet being held in position in its housing in the tube 1 by the pegs 13, 13'.

Figure 6:
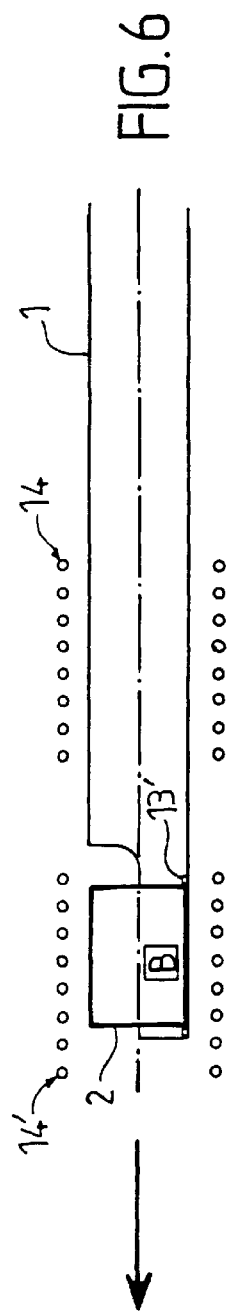

FIG. 6 shows the billet 2 which has passed from position A (FIG. 5) to position B under the effect of translational movement obtained by the ram 3, position B of the billet 2 being centred in the second inductor 14'. In this position, the temperature of the billet is completely uniform.

Figure 7:
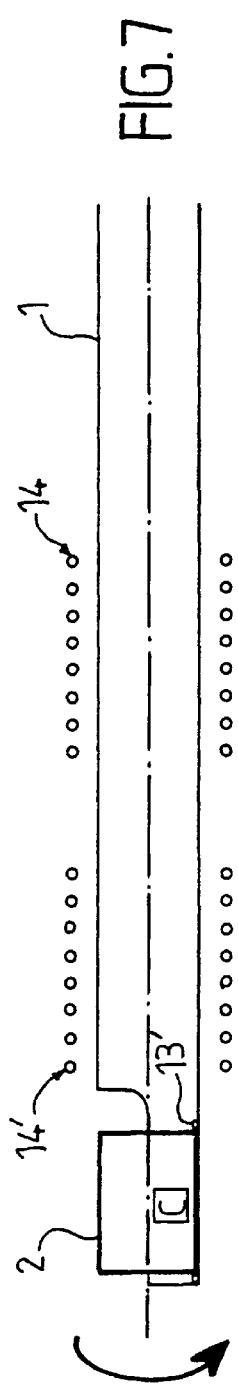

FIG. 7 shows the billet 2 in position C, having emerged from the second inductor 14', and the tube 1 having continued its translational movement along its axis 1 under the effect of the ram 3.

Figure 8:
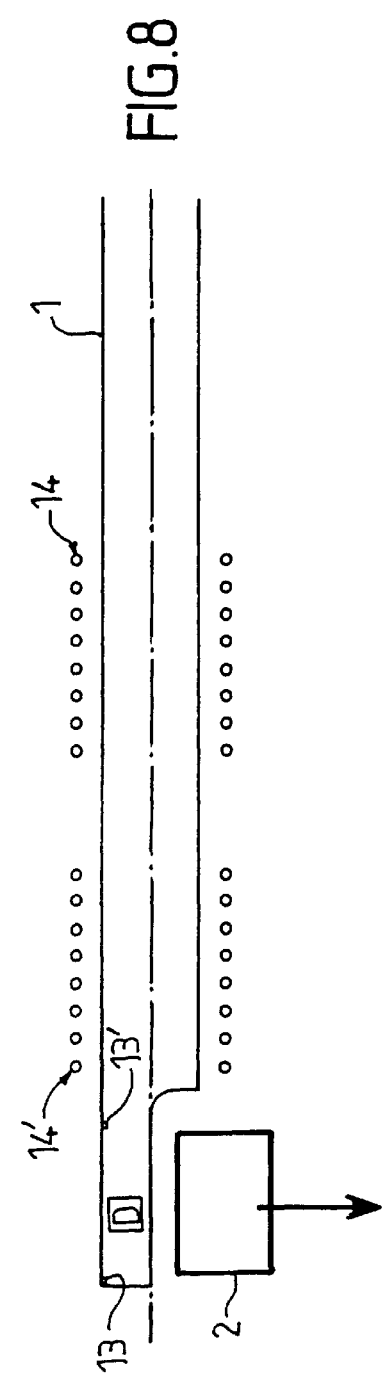

FIG. 8 shows the tube 1 which has undergone a rotation of a half-turn by virtue of the rotary ram 4, the billet 2 then leaving its housing in the tube 1 (position D) and dropping, in free fall, directly into the injection chamber or into the press die lying beneath its housing, vertically below the latter, which chamber or die is not shown in FIG. 8 but may be seen at 16 in FIG. 9 for example.

As soon as the billet has dropped into the injection chamber 16, means (described hereinbelow with reference to FIG. 9) make it possible to check that it is correctly positioned in the injection chamber and as soon as this check has been made, the injection is triggered. When the device according to the invention is applied to a forging press, the transfer device described hereinabove makes a rapid incursion between the die of the press and the punch in order to discharge a billet. As soon as the transfer device has been retracted, the punch of the press is free to descend in order to carry out the forging operation.

It should be emphasized that all the operations illustrated in FIGS. 5 to 8 are performed in a time of less than or approximately one minute, enabling an ingot of magnesium alloy such as AZ 91 to be reheated without it having time to burn, even in the absence of injection of protective gas delivered through the nozzle 12 (FIG. 1).

Figure 9:
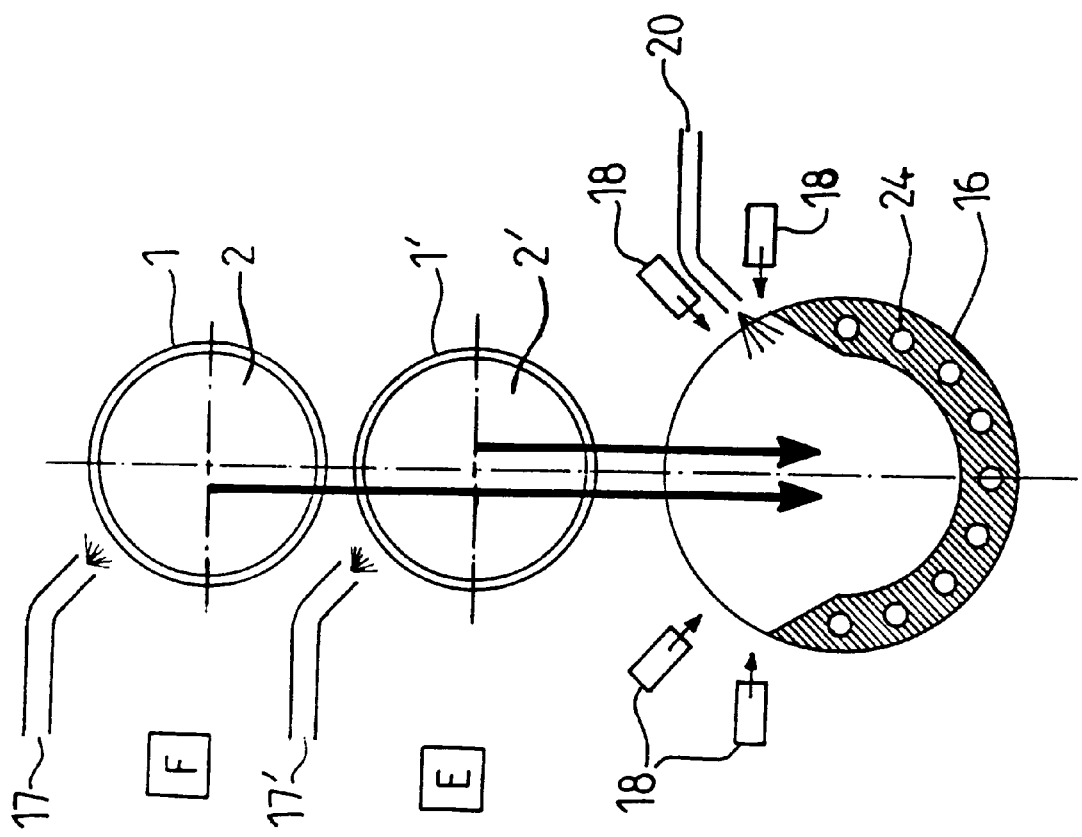
FIG. 9 illustrates an alternative form of the invention employing two feed devices, this figure being a diagrammatic view in vertical cross-section.

Reference is now made to FIG. 9 which illustrates an alternative form of the invention having two feed devices of the type illustrated in the previous figures. In this alternative form, these two feed devices are superimposed vertically, their axes lying in the vertical plane passing through the axis of the injection chamber 16 or in the press die. Shown diagrammatically at 1 and 1' are the tubes of the two feed systems with their pipe 17, 17' for supplying a release agent, the respective billets being shown at 2, 2'. In this same FIG. 9, the means provided by the invention for checking that a billet 2 or 2' is correctly positioned in the injection chamber 16 have been shown at 18. In this embodiment, these means may be produced in the form of infrared cells or of proximity and passage sensors. As soon as it has been checked that the billet is correctly positioned in the injection chamber 16 (or in the press die), a signal immediately gives the order to trigger the injection (or the descent of the punch of the press) using a piston (not shown) placed in the chamber 16. The latter has holes for resistive heating elements, as shown at 24. According to the invention, a pipe 20 is also provided for supplying a release agent, in powder or liquid form, into the injection chamber 16 so as to prevent any bonding of the billet in the latter.

This alternative form of the invention, illustrated in FIG. 9, which uses two superimposed devices E and F identical to those described in FIGS. 5 to 8, illustrates a device making it possible to start heating a billet 2'while the other billet 2 is still halfway through the reheating cycle. Positions A, B, C, and D are also those relating to FIGS. 5 to 8.

The operation of this alternative form of the invention is as follows:

the first billet 2', in position A on a device in FIGS. 5 to 8 is heated using a device similar to that described hereinabove with reference to FIGS. 5 to 8. After approximately 30 s, it passes into position B such as that of the device intended at position A and the second billet 2 starts to heat in position A with another heating device similar to that illustrated in FIGS. 5 to 8 but positioned above at F in a vertical plane passing through the injection axis and the axis of the feed device lying below.

After approximately one minute has elapsed, the billet 2' leaves the inductor in position B and passes into position C (see FIG. 7), then undergoes a rotation of a half-turn and finally drops directly into the injection chamber 16 (as illustrated in FIG. 8). The injection as described above occurs immediately and a moulded part is obtained. Meanwhile, the billet 2 passes into position B and a third billet has been loaded into the feed device lying below, which starts to heat in position A.

Approximately thirty seconds later, the second billet 2 passes into position C (see FIG. 7), then undergoes a rotation of a half-turn and finally drops into the injection chamber (see FIG. 8), and so on. After the billet has been discharged into the injection chamber 16, the tube 1 of the feed device undergoes a rotation of a half-turn in the opposite direction under the effect of the rotary ram 4 and is immediately recharged with a fresh billet. It is thus possible to achieve an injection every 30 seconds. During these thirty seconds, a casting is pressure die-cast, cooled and ejected, the mould is coated in the open position by means of the tube 20 with a release agent, preferably using a mixture consisting of powders in the case of semi-solid or semi-liquid alloy billets, and the mould is closed.

Of course, the alternative form described hereinabove with reference to FIG. 9 may also apply to a forging press, the transfer device feeding the punch of the press.

According to the present invention, it is possible to work in parallel and further increase the injection rate (or the forging rate in the case of application of the invention to a forging press) by superposition of a plurality of devices identical to the one illustrated in FIGS. 5 to 8, thereby achieving production rates identical to those normally obtained with materials in the liquid state. By virtue of the invention, a magnesium alloy (AZ 91) billet was even successfully reheated in approximately 1 minute with a single inductor. The great advantage of the invention is that it allows operation without a melting bath, and therefore with complete safety in the case of inflammable alloys.

The device according to the present invention may be used for reheating and transferring plastic billets filled with an electrically conductive material, for example coke-filled ABS or conductive polymers filled with carbon fibres or metal fibres and also with carbon black. Some of these materials are reputed to be difficult to inject. In addition, conventional screw machines currently used cause significant shear, this having the effect of reducing the conductivity of moulded components made of conductive polymers by 1 or 2 orders of magnitude. The device of the present invention enables this drawback to be avoided and, in addition, enables rapid reheating which also avoids prolonged exposure to high temperature which leads to an irreversible reduction in the conductivity. This device thus makes the material capable of being reheated by induction.

The device according to the present invention may be completed by providing a manipulator robot intended to seize the billets in the solid state in order to place them in the feed support or the various feed supports (tube 1 and their cut-out for positioning the billets) which are described hereinabove.

It will be noted that it is essential for the invention for the axes of the various reheating devices such as 14 and 14' to lie, immediately before triggering the rotational motion under the action of the rotary ram 4, substantially in the vertical plane passing through the axis of the injection chamber 16 so that the billet passes directly from its position in which it is held horizontally in its housing 6, 7 or 8 in the tube 1, by free fall, under the effect of gravity and without contact or intervention of any manipulator. Thus, by virtue of the invention, it is even possible to drop completely molten ingots into the injection chamber.

In the alternative form of the invention illustrated in FIG. 10, the feed devices are placed horizontally instead of being placed vertically as described hereinabove. According to this FIG. 10, two feed devices have been provided, these lying in the same horizontal plane, each of them being shown diagrammatically by its heating inductors, respectively $14_1$ and $14_2$, together with their respective matching cabinet $22_1$ and $22_2$.

In this alternative form, the feed devices according to the invention with their respective heating inductors are not fixed, as previously, to the injection machine but are mounted in a sliding carriage (not shown) moving along the direction of the arrows $F_1$ and $F_2$. This arrangement is produced so that each feed device can deliver a reheated billet to the single injection chamber 16. Of course, this same alternative form can also apply to a forging press.

Figure 10:
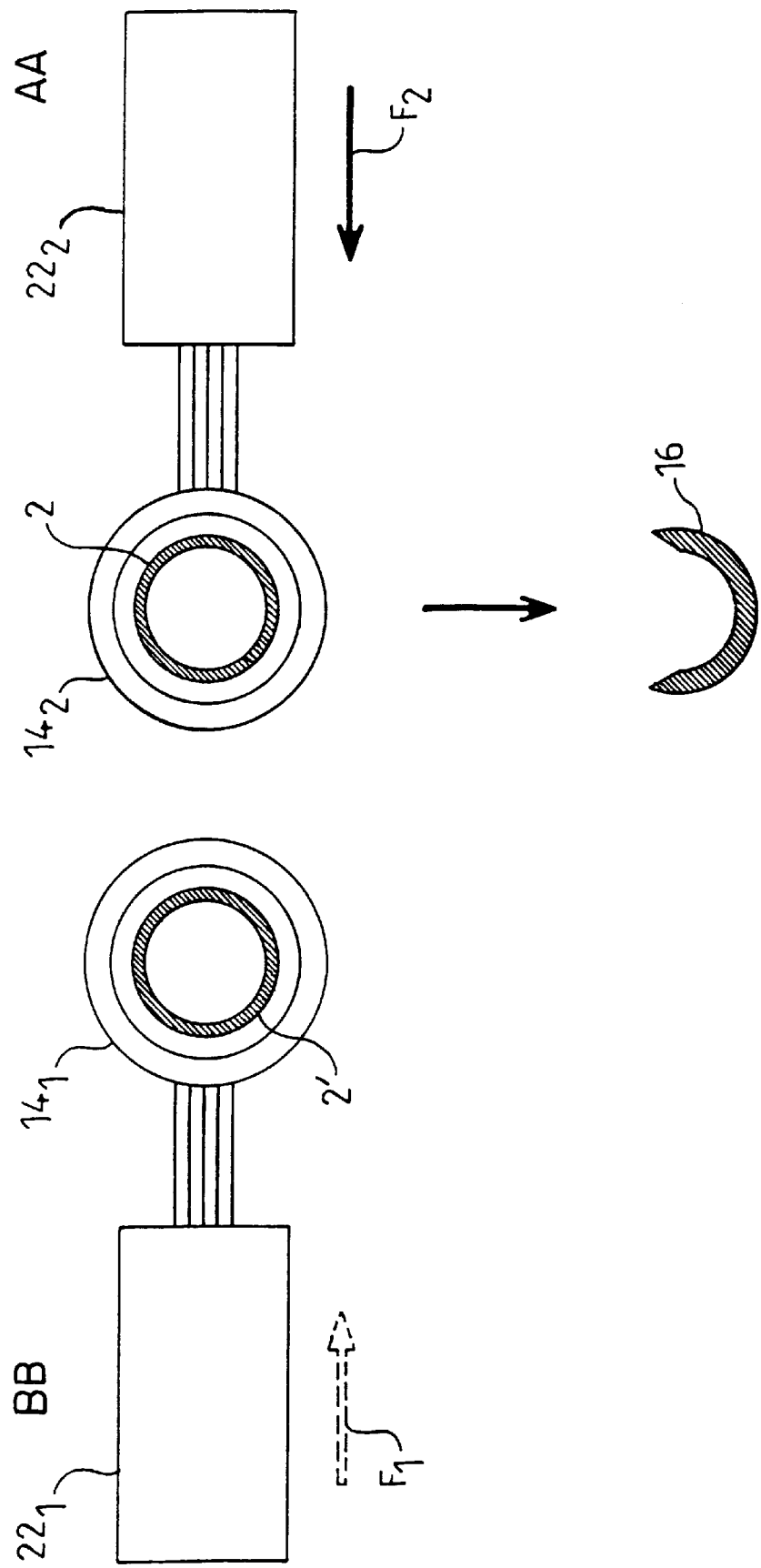
FIGS. 10 to 12 are diagrammatic views similar to FIG. 9, illustrating various alternative forms of the invention employing a plurality of feed devices.

In this FIG. 10, the entire feed and heating device lying in position AA to the right in this figure is in the heating phase and is ready to discharge the billet 2 into the infection chamber 16. Meanwhile, the identical device lying in position BB to the left looking at FIG. 10 starts to preheat another billet 2'. When this billet 2' has been reheated and after the billet 2 has been transferred into the injection chamber 16 and after the feed and heating device lying in position AA has been brought back into the position for reheating a fresh billet, the entire device situated at BB is moved by means of its sliding carriage along the direction of the arrow $F_1$ so as to bring the billet 2' above the injection chamber 16 into which it is transferred by gravity, as described hereinabove, with reference especially to FIGS. 5 to 8. Next, this same device is brought back into the reheating position in order to receive a fresh billet, while the other heating and feed device lying in position BB can feed the injection chamber 16 using the billet which was in the reheating position, this operation being carried out by virtue of the presence of the sliding carriage on which each billet heating and feed device is mounted.

Figure 11:
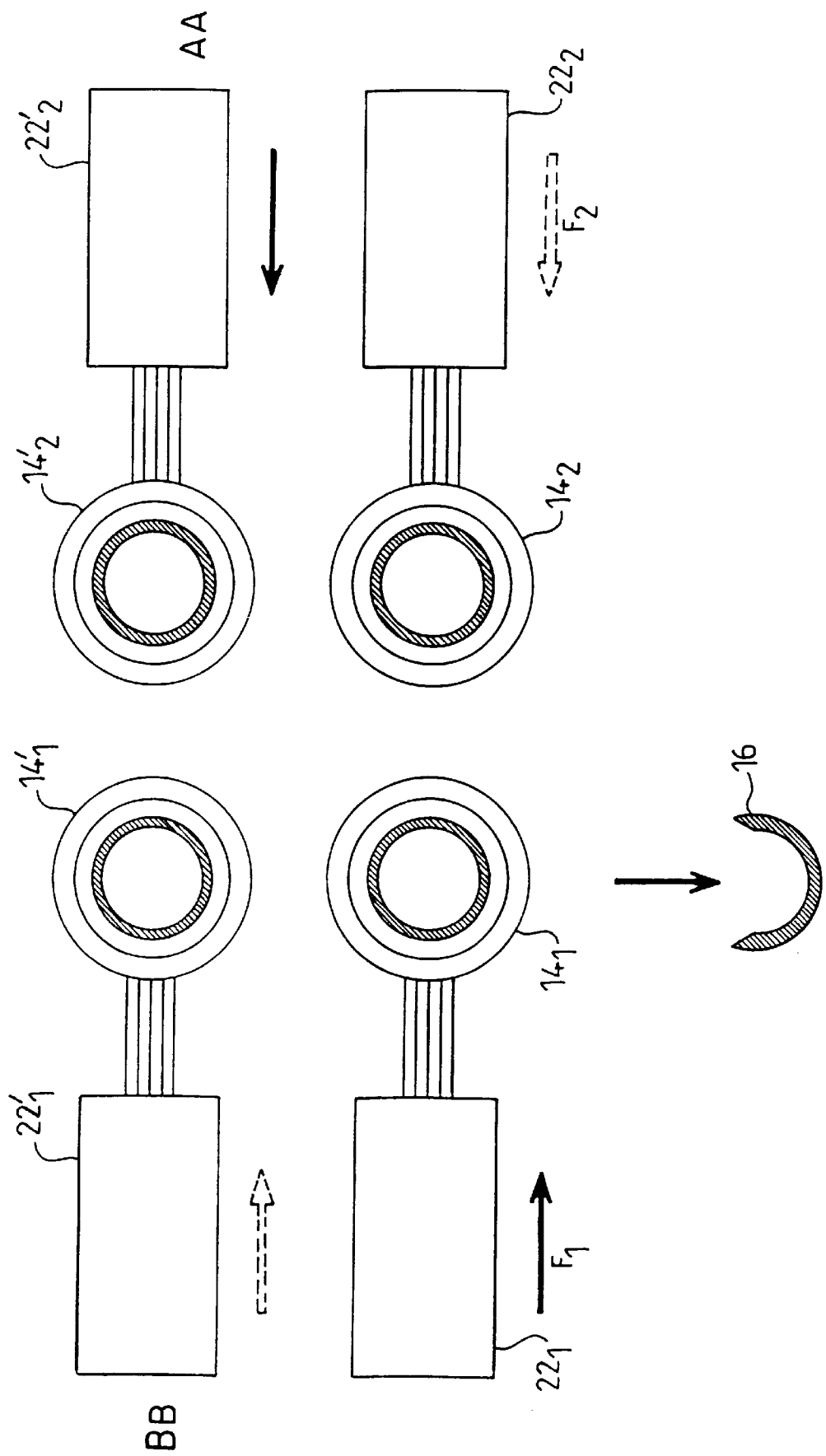

FIG. 11 illustrates an alternative form of the embodiment shown in FIG. 10. In this alternative form, the system is duplicated by superimposing two devices such as illustrated in FIG. 10. Thus, in this alternative form, two identical pairs of heating and feed devices, respectively $14_1$, $22_1$, $14_2$, $22_2$ and $14'_1$ $22'_1$, $14'_2$, $22'_2$ have been superimposed, each being mounted on a sliding carriage, in the same manner as described hereinabove, with reference to FIG. 10, in order to move in translation in the direction of the arrows $F_1$ and $F_2$ so as to feed the injection chamber 16 successively with reheated billets.

Figure 12:
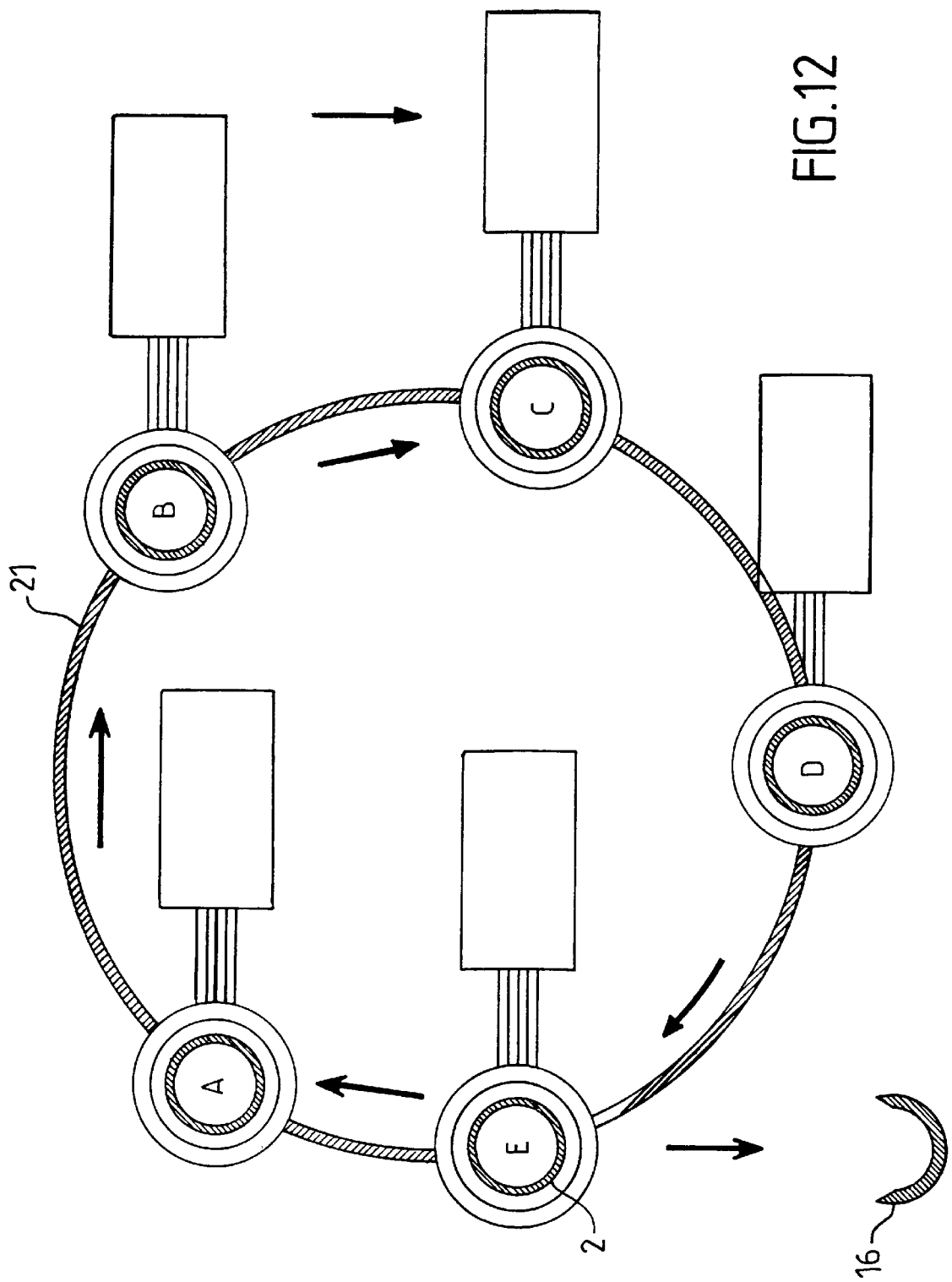

Another possibility provided by the present invention consists in increasing the number of billet-reheating stations, placing them on a closed curve of any shape, for example on a circle 21 as illustrated in FIG. 12, the feed devices of the type described hereinabove, especially with reference to FIGS. 1 to 8 then being mounted on a rotating stage or on a noria-type transporter positioned on a slide allowing to-and-fro (forward and back) translational movement of the system. This FIG. 12 and FIG. 13 show diagrammatically and sequence of operation respectively an installation according to this alternative form of the invention, consisting of five heating stations (this number not being limiting, of course), of the inductor or furnace type, these stations lying in a fixed position on the circle 21, respectively at A, B, C, D, E. A billet-feed device, as specified hereinabove, corresponds to each of these stations.

The operating sequence of this device has been indicated in the diagram of FIG. 13. It is as follows:

a billet-feed device is in the rear retracted position in which it receives a cold billet 2 which is positioned in the housing in the feed device (tube 1) by means of a loading system (not shown);

next, the feed device is brought into position A in which the billet 2 is reheated by the inductor or inductors 14;

next, this feed device is retracted from position A so as to release the previously reheated billet by moving it away from the reheating system 14, and, in order to pass opposite position B, by rotation through one fifth of a turn of the rotating stage on which this feed device is mounted;

the feed device then undergoes a new translational movement in order to bring the billet 2 into position B where it continues to be reheated by the device consisting of inductors 14;

next, the same operations as described above are repeated in order to carry out the successive passages from B to C, C to D and D to E;

finally, in position A, the billet 2 undergoes final heating and is then discharged into the injection chamber 16, in the manner described hereinabove with reference especially to FIGS. 7 and 8.

By virtue of this embodiment, the billet 2, in the various heating positions A–E, is gradually heated with powers and possibly induction frequencies which are different, these being chosen so as to obtain uniform heating of this billet when it reaches position E immediately before it is transferred into the injection chamber 16 by the feed device according to the present invention.

According to yet another embodiment of the device forming the subject of this invention, the induction heating stations may be replaced by a heating tunnel or by a combination of inductors and of one or more chambers heating by radiation or convection. As was mentioned hereinabove, the number of heating stations in the alternative form illustrated in FIGS. 12 and 13 can take any value and is not limited to 5. It should be emphasized that with a device having five heating stations, it is possible to achieve, with billets 2 in the pasty state, a rate greater than that obtained by liquid-metal injection, given that the temperature of the injected component is lower and therefore that its cooling time is shorter.

After reading the above description it is clear that the invention provides a device enabling billets to be transferred in the solid, semi-solid, semi-liquid or liquid state, without causing them to undergo deformation or loss of material, while at the same time obtaining transfer rates greater than those which are able to be obtained by currently used devices.

Of course, it remains the case that the present invention is not limited to the embodiments described and/or mentioned here, but that it encompasses all alternative forms thereof within the scope of the appended claims. Thus, in particular, the feed device according to the present invention applies not only to an injection chamber of a pressure die-casting or injection machine but also, as mentioned above, to a forging press for feeding the tool or the press die. All the alternative forms described above also apply to such a forging press.

What is claimed is:

1. A feed device for an injection chamber of a pressure die-casting or injection machine or for a press tool or a forging press die, and for transferring a billet of metal, whether filled or unfilled, in a liquid, solid, semi-solid or semi-liquid state, and which has a support with a horizontal axis, said support receiving and housing the billet and transferring the billet into the injection chamber or into the press-die, wherein, said billet support being positionable in at least one heating system, and includes a tube for receiving said billet, said tube being fitted into a cylindrical metal piece, with interposition of seals so as to hold said tube tight in said cylindrical piece, said cylindrical piece being mounted on a pneumatic ram which imparts to said tube a rotational about a cylindrical axis of motion said tube, said pneumatic ram being mounted on an end of a pneumatic translational ram imparting to the tube a to-and-from translational motion along said tube axis, said rams transporting the billet from a heating position in said heating system to a position lying vertically above the injection chamber or the press die, and then rotating said tube so as to cause the billet to drop, horizontally under gravity, from said support into said injection chamber or into the press-die.

2. The device according to claim 1, wherein said support tube has circular or prismatic cross-section, and is made of refractory material having a radial dimension greater than that of the billet to be transferred, and the tube having a cut-out defining a semi-circular housing for receiving the billet.

3. The device according to claim 2 wherein said cut-out is located at one end of said tube away from said cylindrical piece connection to said translational ram and defines a spoon-shaped housing.

4. The device according to claim 2, wherein said cut-out is made over the entire length of the said tube.

5. The device according to claim 2, wherein said cut-out is in the form of a trough.

6. The device according to claim 2, wherein said tube is provided with bearing support at said one end.

7. The device according to claim 1, wherein said cylindrical piece into which the tube is fitted is pierced with a nozzle for supplying a protective gas to said billet.

8. The device according to claim 1, wherein an internal surface of the said tube has pegs serving as chocks for the billet which it receives.

9. The device according to claim 1, wherein said heating system is an induction or Joule-effect heating system.

10. The device according to claim 9 wherein axes of the heating system lie, just before initiating the rotational motion, substantially in a vertical plane passing through a vertical central axis of the injection chamber or of the press die.

11. The device according to claim 1, wherein said pneumatic translational ram includes end-of-travel contacts in order respectively to switch on and off the heating system surrounding the said tube.

12. The device according to claim 1 wherein said tube is made of a material selected from a group consisting of ceramics, quartz, alumina, reinforced plastics and composites.

13. A pressure die-casting or injection machine, or forging machine, for materials in the liquid, solid, semi-liquid or semi-solid state, comprising a plurality of feed devices according to claim 1 each device for transferring a billet of the metal whether filled or unfilled, in a liquid, solid, semi-liquid or semi-solid state, comprising a support with a horizontal axis receiving and housing the billet and means for moving the support for the purpose of transferring the billet into the injection chamber or into the press die, wherein the support is movably located in at least one heating system and the means for transferring the billet comprises means for moving the support in a horizontal translational motion for transporting the billet from the heating system to a position lying vertically above the injection chamber or the press die and means for moving the support in a rotational motion about its axis so as to cause the billet to drop, in the horizontal position, under gravity, from the said support into the said injection chamber or into the press die, and including two such feed devices which are positionable vertically above the injection chamber or the press die.

14. The machine according to claim 13, including a plurality of feed devices with each feed device having its heating system being mounted on a transfer carriage for delivering a billet in succession into the injection chamber or into the press die.

15. The machine according to claim 14, wherein the heating positions of said heating systems are placed on a closed curve and the same number of feed devices as said heating positions, and are movable and mounted on a rotating stage.

16. The machine according to claim 14 wherein said feed devices are arranged horizontally.

17. The machine according to claim 13, wherein said plurality of feed devices includes pairs of horizontal feed devices, each with its heating system, these pairs being superimposed vertically.

18. The machine according to claim 13, wherein the injection chamber, or the press die, is provided with sensors for checking that the billet is correctly positioned in the said chamber, or in the said die, the signal emitted by the said sensors being used to control the injection or the descent of the punch of the press.

19. The machine according to claim 13 wherein the injection chamber is provided with means for supplying a release agent.

20. The machine according to claim 13 comprising two feed devices which are superimposed vertically.

21. A feed device for an injection chamber of a pressure die-casting or injection machine or for a press tool or a forging press die, for transferring a billet of metal whether filled or unfilled, in a liquid, solid, semi-liquid or semi-solid state, comprising a support with a horizontal axis, said support receiving and housing the billet and transferring means for moving the support for the purpose of transferring the billet into the injection chamber or into the press die, wherein the support is movably located in at least one heating system and the transferring means comprises means for moving the support in a horizontal translational motion for transporting the billet from the heating system to a position lying vertically above the injection chamber or the press die and means for moving the support in a rotational motion about its axis so as to cause the billet to drop, in a horizontal position, under gravity, from the said support into the said injection chamber or into the press die, and said billet support is provided with means for supplying a release agent.

22. The device according to claim 21 further including, means for preheating the billet, these means being positioned upstream from said transferring means.

* * * * *